United States Patent [19]

Treadaway, Sr.

[11] Patent Number: 4,974,955
[45] Date of Patent: Dec. 4, 1990

[54] EYEGLASS RETAINER WITH DECORATIVE ATTACHMENT

[76] Inventor: James E. Treadaway, Sr., 2021 Emeralda Dr., Orlando, Fla. 32808

[21] Appl. No.: 383,741

[22] Filed: Jul. 24, 1989

[51] Int. Cl.⁵ .................. G02C 11/02; G02C 5/14
[52] U.S. Cl. ................................. 351/123; 351/52
[58] Field of Search ............... 351/51, 52, 123; 2/13; 24/3 C

[56] References Cited

U.S. PATENT DOCUMENTS

| | | | |
|---|---|---|---|
| 2,229,568 | 1/1941 | Hodgkins | 351/123 |
| 4,153,346 | 5/1979 | Gomer | 351/52 |

FOREIGN PATENT DOCUMENTS 376978   6/1923   Fed. Rep. of Germany ...... 351/123

*Primary Examiner*—Rodney B. Bovernick

[57] ABSTRACT

This invention relates to an eyeglass/sunglass snuggling device which attaches to the temple piece of glasses. It also is designed to accept a decorative pendant which is removable when it is undesirable to wear. The device can be detached from the temple piece and worn separately if so desired.

The invention comprises tubing; a deformable material to provide better fit around the ear; and, a detachable pendant which is held by a chain.

1 Claim, 1 Drawing Sheet

EYEGLASS RETAINER WITH DECORATIVE ATTACHMENT

TECHNICAL FIELD

This invention relates to the field of the retention of eyeglasses/sunglasses when working or participating in light sporting events.

BACKGROUND ART

There are three devices known to the inventor. One is a device which straps to the temple pieces, goes around the back of the head and is tightened with a buckle. Another, clips to the temple pieces and hangs loosely around the back of the neck. The third device is tubing which connects over the ends of the temple pieces and fits around the back of the head.

DISCLOSURE OF THE INVENTION

This invention provides advantages over present technology, since it is designed to accept the decorative pendant. It also can be worn at all times and is hardly noticeable, since it rests behind the ear. The invention comprises: tubing; a deformable material to provide better fit around the ear; and, a detachable pendant which is held by a chain.

BRIEF DESCRIPTION OF THE DRWAINGS

DETAILED DESCRIPTION OF THE INVENTION

Figure 1:
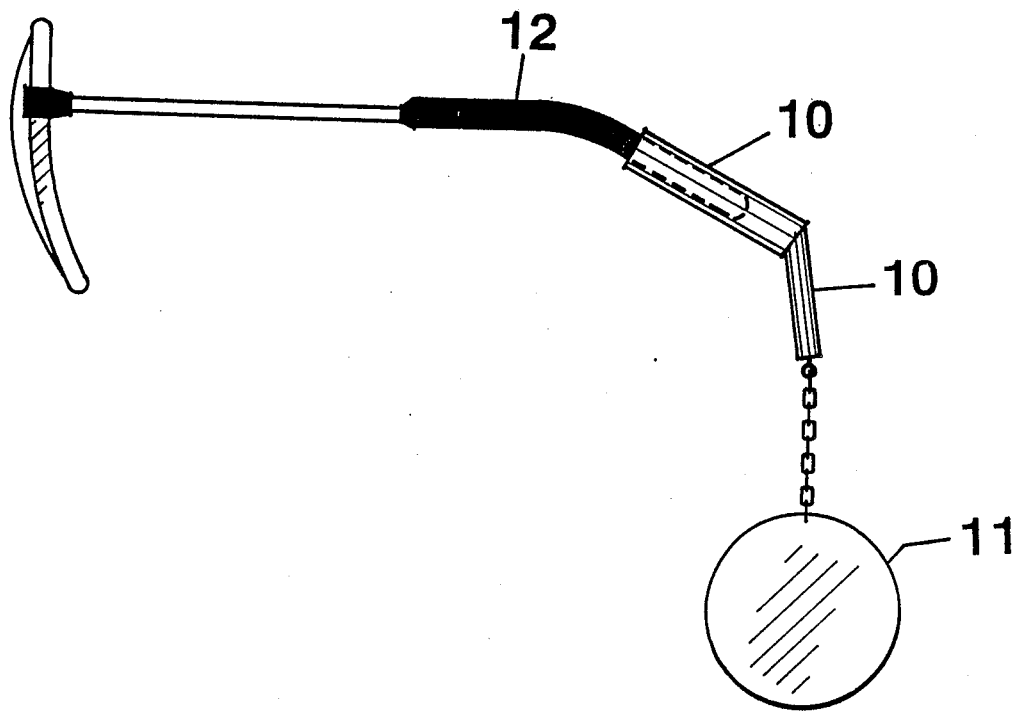
FIG. 1 is a side view of the snuggler device attached to the glasses temple piece.

FIG. 1 shows the glasses snuggling device 10 with a pendant 11 attached to the temple piece of the glasses 12.

Figure 2:
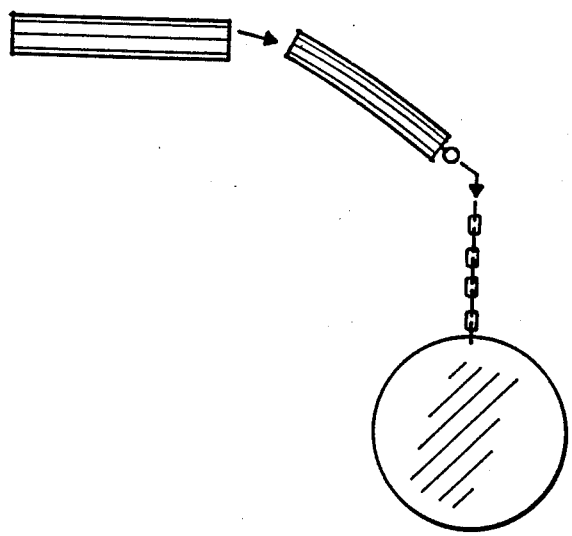
FIG. 2 is a disassembled side view of the snuggler device.

FIG. 2 shows a disassembled view of the snuggler. It consists of three pieces: (1) a piece of tubing which can be made of rubber, plastic or other suitable material; (2) a piece of deformable material such as metal, plastic or nylon which will allow itself to be formed to the contour of the ear; and, (3) a detachable chain-held pendant made of metal, plastic, wood or other suitable material.

Figure 3:
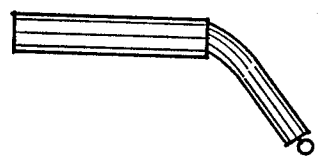
FIG. 3 is a side view of the device which provides the snuggling effect.

FIG. 3 shows the two pieces of the device which provides the snuggling effect and can be worn separately with the glasses. It also can be worn with the pendant and without the glasses if so desired.

What is claimed is:

1. An eyeglass temple piece device for the combined purpose of attaching a decorative pendant and maintaining the eyeglasses in a fixed position for certain activities comprising a section of flexible tubing which stretches over the end of the temple piece and upwards on said temple piece around the back of the ear and downward beyond the end of said temple piece, a section of centerpiece material, either solid or tubular, which is inserted into the flexible tubing below the end of the temple piece and formed to fit the rear contour of the ear extending to the lower lip of the earlobe, said section containing a clip for attaching a pendant, a pendant with attaching chain and eye for clipping to the centerpiece material, said pendant being removable thereby allowing the flexable tubing section and the centerpiece section of the device to be used to maintain the eyeglasses in a fixed position for light sporting or other activities.

* * * * *